US010087901B2

(12) United States Patent
Marechal et al.

(10) Patent No.: US 10,087,901 B2
(45) Date of Patent: Oct. 2, 2018

(54) HIGH PRESSURE VALVE

(71) Applicant: DELPHI TECHNOLOGIES IP LIMITED, St. Michael (BB)

(72) Inventors: Michel Marechal, Chouzy-sur-Cisse (FR); Frederic Sauvage, Beaugency (FR); Matthieu Magre, Orleans (FR); Richard Dupont, Tours (FR)

(73) Assignee: DELPHI TECHNOLOGIES IP LIMITED (BB)

( * ) Notice: Subject to any disclaimer, the term of this patent is extended or adjusted under 35 U.S.C. 154(b) by 35 days.

(21) Appl. No.: 14/439,311

(22) PCT Filed: Jul. 30, 2013

(86) PCT No.: PCT/EP2013/066016
§ 371 (c)(1),
(2) Date: Jun. 28, 2017

(87) PCT Pub. No.: WO2014/067679
PCT Pub. Date: May 8, 2014

(65) Prior Publication Data
US 2017/0306914 A1    Oct. 26, 2017

(30) Foreign Application Priority Data

Oct. 30, 2012    (FR) ..................................... 12 60350

(51) Int. Cl.
*F16K 31/06*    (2006.01)
*F02M 63/00*    (2006.01)
(Continued)

(52) U.S. Cl.
CPC .... *F02M 63/0021* (2013.01); *F02M 63/0019* (2013.01); *F02M 63/0024* (2013.01);
(Continued)

(58) Field of Classification Search
CPC ............... F16K 31/0655; F16K 27/029; Y10T 137/5987; F02M 63/0019; F02M 63/0021; H01F 7/128
(Continued)

(56) References Cited

U.S. PATENT DOCUMENTS 5,722,633 A * 3/1998 Goossens ................ B60T 8/363
                                                                   251/129.15
5,791,747 A * 8/1998 Sorensen .................. B60T 8/36
                                                                   251/129.02
(Continued)

FOREIGN PATENT DOCUMENTS

DE    10 2006 042214 A1    3/2006
DE    10 2005 034939 A1    2/2007
(Continued)

OTHER PUBLICATIONS

International Search Report dated Oct. 2, 2013.

*Primary Examiner* — Matthew W Jellett
(74) *Attorney, Agent, or Firm* — Joshua M. Haines

(57) ABSTRACT

A high pressure valve includes a body on which is fixed an electromagnet, the shell of which has a radial discal part provided with a central hole connecting an internal opposite surface to an external surface. The body is provided with a cylindrical external centring surface and with a radial support surface. The shell is arranged on the body around the centring surface, the external discal surface being in surface contact against the support surface of the body. The coil of the electromagnet is arranged in the tubular space between the body and the shell itself closed by a closure ring. The liquid-tightness between the body and the shell is ensured by a gasket compressed by a wedging washer against the centring surface and against the internal discal surface. The shell is then immobilized on the body by the wedging washer.

20 Claims, 1 Drawing Sheet

(51) Int. Cl.
  *F16K 27/02* (2006.01)
  *H01F 7/16* (2006.01)
  *H01F 7/128* (2006.01)

(52) U.S. Cl.
  CPC ........ *F16K 27/029* (2013.01); *F16K 31/0655* (2013.01); *H01F 7/128* (2013.01); *H01F 7/1607* (2013.01); *F02M 2200/16* (2013.01); *Y10T 137/5987* (2015.04)

(58) Field of Classification Search
  USPC .................................. 251/129.15; 303/119.2
  See application file for complete search history.

(56) References Cited

U.S. PATENT DOCUMENTS

| | | | |
|---|---|---|---|
| 5,845,672 A * | 12/1998 | Reuter | ............... B60T 8/3675 137/315.03 |
| 6,113,066 A * | 9/2000 | Hohl | ...................... B60T 8/363 251/129.02 |
| 7,137,411 B2 * | 11/2006 | Golovatai-Schmidt | ...................... F16K 31/0637 137/625.65 |
| 7,988,126 B2 * | 8/2011 | Hoppe | ................... H01F 7/128 251/129.15 |
| 8,632,050 B2 * | 1/2014 | Stoeckel | ............ F16K 31/0634 251/129.15 |
| 2003/0145831 A1 | 8/2003 | Liskow | |
| 2007/0017587 A1 | 1/2007 | Groschel et al. | |
| 2009/0293844 A1 | 12/2009 | Escandell et al. | |
| 2010/0025606 A1 | 2/2010 | Hoppe et al. | |

FOREIGN PATENT DOCUMENTS

| | | |
|---|---|---|
| FR | 2 889 572 A1 | 2/2007 |
| JP | 8-219289 A | 8/1996 |
| JP | 9-222058 A | 8/1997 |

* cited by examiner

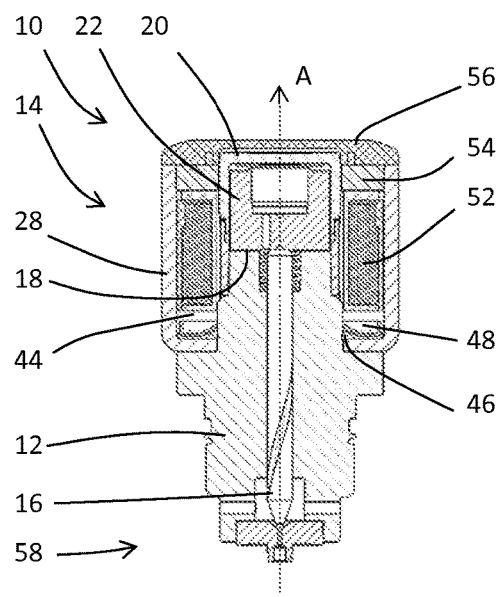
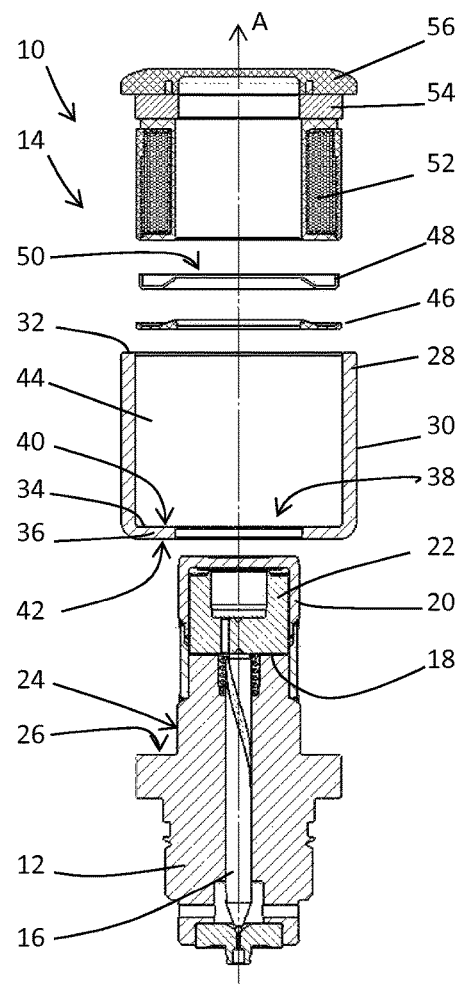
Fig. 1
Fig. 2

HIGH PRESSURE VALVE

TECHNICAL FIELD

The invention relates to a high pressure valve for a diesel injection circuit and more particularly the arrangement of these components and their manufacture.

TECHNOLOGICAL BACKGROUND OF THE INVENTION

Direct fuel injection circuits in internal combustion engines comprise a pilot-operated valve which can be directly connected to a common rail distributing fuel under pressure to injectors. The valve is normally closed and can be actuated to open a passage and allow fuel to leave thus permitting continuous control of the pressure in the injection circuit.

Valves are known inter alia comprising a tubular body in which a needle piloted by an electromagnetic actuator obturates or opens the outlet passage of the fuel. In normal operation the passage is closed and its closure is ensured by the piloted actuator which applies to the needle a closure force opposing the opening force applied to the needle by the pressurised fuel. A valve is known from EP1915557 comprising a magnetic body on which are stacked the shell of the coil of the electromagnet, a sealing gasket and the coil itself. The assembly is held in place by a wedging washer. However this arrangement is not liquid-tight as a fluid foreign to the carburettor, water for example, can enter the shell by passing around the washer.

It has become urgent to propose completely liquid-tight valves which are easy to manufacture and assemble.

SUMMARY OF THE INVENTION

The present invention resolves the problems mentioned above by proposing a high pressure valve forming part of the common rail diesel injection circuit of an internal combustion engine. The valve comprises an axial body on which is fixed an electromagnet having a shell, a coil and a core enclosed under a bell capping the body. The core actuates a needle between an open state and a closed state. The shell has an axial tubular part open at a first end, the upper end relatively to the direction of the Figures, and a radial discal part at a second end, the lower end relatively to the direction of the Figures. The discal part has a central hole connecting an opposite internal surface to an external surface. The body is provided externally with a cylindrical centring surface and with a radial support surface. The shell is arranged on the body around the centring surface, the external discal surface being in surface contact against the support surface of the body. A tubular space is then formed between the body and the tubular part of the shell. The coil is arranged in the tubular space itself closed by a closure ring. The seal between the body and the shell is ensured by an elastomeric gasket arranged around the centring surface and against the internal discal surface.

The valve comprises in addition a wedging washer mounted and clamped on the centring surface of the body and arranged between the coil and the sealing gasket. The wedging washer compresses the gasket against the centring surface and against the internal discal surface and the shell is then immobilised on the body by the said wedging washer.

The closure ring holds the coil in place by being mounted and clamped in the shell and being flush with the first end of the shell.

The high pressure valve is in addition provided with a plug arranged on the closure ring, the plug obturating the tubular space in sealed manner.

The radial play between the central hole and the centring surface is less than or equal to 0.5 mm, the shell and its central hole can be made by stamping or pressing or other shaping means in particular by removal of material.

The body, the bell, the closure ring and the shell are made of magnetic materials and are arranged in contact with each other. They thus form a closed magnetic circuit in which the magnetic field created by the coil circulates.

The invention also relates to a common rail diesel fuel injection system comprising a high pressure valve formed in accordance with the preceding paragraphs.

DESCRIPTION OF THE FIGURES

An embodiment of the invention is now described by means of the following figures.

FIG. 1 is a view in axial section of a high pressure valve in accordance with the invention.

FIG. 2 shows the valve of FIG. 1 in an exploded view.

DESCRIPTION OF THE PREFERRED EMBODIMENTS

FIGS. 1 and 2 show a high pressure valve 10 intended to be mounted on the common rail of the diesel injection system 58 of an internal combustion engine.

The valve comprises a body 12 made of a magnetic material, an electromagnet 14 and a needle 16 piloted between an open state and a closed state.

The body 12 extends along a longitudinal axis A between an end connected to the rail and an end 18 distant from the rail, which is capped by a fixed cylindrical bell 20, also made of a magnetic material, and enclosing the core 22 of the electromagnet 14. The core 22 is free to be displaced axially A in the bell 20. The needle 16, axially retained in a central bore of the body 12, is in contact at one end with the core 22 so as to be able to switch state. Externally, the body 12 is provided with a cylindrical centring surface 24 from which radially extends a support surface 26.

The electromagnet 14 comprises a shell 28, also made of a magnetic material, and having a cylindrical bell shape with a flat and drilled base. The shell 28 therefore has a tubular cylindrical part 30 extending axially A between a first open end 32 and a second end 34 from which extends radially, and towards the longitudinal axis A, a discal part 36 provided with a central hole 38. The hole 38 connects an internal discal surface 40 of the shell 28 and an opposite external discal surface 42.

The shell 28 is arranged on the body 12, the centring surface 24 passing into the central hole 38 and the external discal surface 42 coming into surface contact against the support surface 26. A tubular space 44 is thus defined between the body 12 and the shell 28, the internal discal surface 40 forming the bottom of the tubular space 44.

An elastomeric sealing gasket 46 is arranged at the bottom of the tubular space 44, around the centring surface 24 and against the internal discal surface 40. A wedging washer 48, also arranged at the bottom of the shell 28 around the centring surface 24, is placed on the gasket 46.

The washer 48 has a central opening 50 the diameter and the wedge shape of which are selected for the washer 48 to be placed in position and clamped around the centring surface 24 but, once in position, not to be able to be displaced in particular under the influence of vibrations. The washer 48 placed on the gasket 46 compresses it against the body 12 and the shell 28 thus ensuring on the one hand the necessary liquid tightness of the tubular space 44 and on the other hand the positioning of the shell 28 and its immobilisation relatively to the body 12.

The shell 28 then receives a subassembly comprising the coil 52 of the electromagnet 14, a closure ring 54 and a plug 56. The coil 52 is arranged freely in the tubular space 44 around the body 12 and the bell 20 capping it. The closure ring 54, also made of a magnetic material, has the form of a flat washer the inner diameter of which slides freely around the outer diameter of the bell 20 and the outer diameter of which, slightly larger than the inner diameter of the shell, is clamped in the shell enclosing the coil 52. The plug 56 placed bearing on the closure ring 54 and against the first end 32 of the shell 28 obturates in sealed manner the tubular space 44 also ensuring that the closure ring 54 is flush with the first end 32.

The electromagnet 14 is assembled inside the shell 28 in a perfectly liquid tight closed space due to the sealing gasket 46 and to the plug 56.

From a functional point of view, when the coil 52 is supplied, a magnetic field is created and circulates between the body 12, the shell 28, the closure ring 54 and the bell 20, these pieces mounted in contact with each other.

In addition, the mounting thus proposed allows the shell 28 to be held in position due to the action of the wedging washer 48 on the gasket 46 and on the shell 28. The shell 28 no longer needs to be matched to the centring surface 24 with as much precision as before. The radial play between the central hole 38 and the centring surface 24 is less than or equal to 0.5 mm. The shell 28 can then be made by a shaping process of stamping or pressing type, the central hole 38 being formed during this shaping.

We claim:

1. A high pressure valve forming part of the common rail diesel injection circuit of an internal combustion engine, the high pressure valve comprising:
   an axial body on which is fixed an electromagnet having a shell, a coil and a core enclosed under a bell capping the body, the core actuating a needle between an open state and a closed state,
   the shell having an axial tubular part open at a first end and a radial discal part at a second end, the discal part having a central hole connecting an opposite internal surface to an external surface and the body being provided externally with a cylindrical centring surface and with a radial support surface, the shell being arranged on the body around the centring surface, the external discal surface being in surface contact against the support surface of the body, a tubular space then being formed between the body and the tubular part of the shell, the coil being arranged in the tubular space itself closed by a closure ring,
   the liquid-tightness between the body and the shell being ensured by an elastomeric gasket arranged around the centring surface and against the internal discal surface, the high pressure valve being characterised by the fact that it comprises in addition
   a wedging washer mounted and clamped on the centring surface of the body and arranged between the coil and the sealing gasket, the wedging washer compressing the gasket against the centring surface and against the internal discal surface, the shell then being immobilised on the body by the said wedging washer.

2. A high pressure valve as in claim 1 in which the closure ring holds the coil in place, the ring being mounted and clamped in the shell and being flush with the first end of the shell.

3. A high pressure valve as in claim 1, provided in addition with a plug arranged on the closure ring, the plug obturating the tubular space in liquid-tight manner.

4. A high pressure valve as in claim 1, in which the radial play between the central hole and the centring surface is less than or equal to 0.5 mm.

5. A high pressure valve as in claim 1 in which the shell and its central hole are formed by stamping or pressing.

6. A high pressure valve as in claim 1 in which the body, the bell, the closure ring and the shell are made of magnetic material and are arranged in contact with each other forming a closed magnetic circuit in which the magnetic field created by the coil circulates.

7. A common rail diesel fuel injection system comprising:
   a high pressure valve having:
   an axial body on which is fixed an electromagnet having a shell, a coil and a core enclosed under a bell capping the body, the core actuating a needle between an open state and a closed state,
   the shell having an axial tubular part open at a first end and a radial discal part at a second end, the discal part having a central hole connecting an opposite internal surface to an external surface and the body being provided externally with a cylindrical centring surface and with a radial support surface, the shell being arranged on the body around the centring surface, the external discal surface being in surface contact against the support surface of the body, a tubular space then being formed between the body and the tubular part of the shell, the coil being arranged in the tubular space itself closed by a closure ring,
   the liquid-tightness between the body and the shell being ensured by an elastomeric gasket arranged around the centring surface and against the internal discal surface, the high pressure valve being characterised by the fact that it comprises in addition
   a wedging washer mounted and clamped on the centring surface of the body and arranged between the coil and the sealing gasket, the wedging washer compressing the gasket against the centring surface and against the internal discal surface, the shell then being immobilised on the body by the said wedging washer.

8. A high pressure valve as in claim 2, provided in addition with a plug arranged on the closure ring, the plug obturating the tubular space in liquid-tight manner.

9. A high pressure valve as in claim 2, in which the radial play between the central hole and the centring surface is less than or equal to 0.5 mm.

10. A high pressure valve as in claim 2 in which the shell and its central hole are formed by stamping or pressing.

11. A high pressure valve as in claim 2 in which the body, the bell, the closure ring and the shell are made of magnetic material and are arranged in contact with each other forming a closed magnetic circuit in which the magnetic field created by the coil circulates.

12. A high pressure valve as in claim 3, in which the radial play between the central hole and the centring surface is less than or equal to 0.5 mm.

13. A high pressure valve as in claim 3 in which the shell and its central hole are formed by stamping or pressing.

14. A high pressure valve as in claim 3 in which the body, the bell, the closure ring and the shell are made of magnetic material and are arranged in contact with each other forming a closed magnetic circuit in which the magnetic field created by the coil circulates.

15. A high pressure valve as in claim 4 in which the shell and its central hole are formed by stamping or pressing.

16. A high pressure valve as in claim 4 in which the body, the bell, the closure ring and the shell are made of magnetic material and are arranged in contact with each other forming a closed magnetic circuit in which the magnetic field created by the coil circulates.

17. A high pressure valve as in claim 8, in which the radial play between the central hole and the centring surface is less than or equal to 0.5 mm.

18. A high pressure valve as in claim 8 in which the body, the bell, the closure ring and the shell are made of magnetic material and are arranged in contact with each other forming a closed magnetic circuit in which the magnetic field created by the coil circulates.

19. A high pressure valve as in claim 9 in which the body, the bell, the closure ring and the shell are made of magnetic material and are arranged in contact with each other forming a closed magnetic circuit in which the magnetic field created by the coil circulates.

20. A high pressure valve as in claim 12 in which the body, the bell, the closure ring and the shell are made of magnetic material and are arranged in contact with each other forming a closed magnetic circuit in which the magnetic field created by the coil circulates.

\* \* \* \* \*